Figure 1:
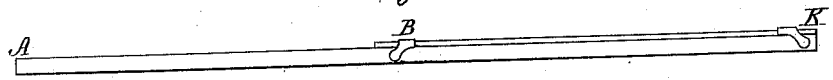

F. WELDON.
Apparatus for Measuring Distances.

No. 165,282. Patented July 6, 1875.

WITNESSES:
Solon C. Kemon
Chas. A. Pettit

INVENTOR:
Francis Weldon
BY
ATTORNEYS.

N. PETERS, PHOTO-LITHOGRAPHER, WASHINGTON, D.C.

UNITED STATES PATENT OFFICE.

FRANCIS WELDON, OF MOMINABAD, DECCAN, INDIA.

IMPROVEMENT IN APPARATUS FOR MEASURING DISTANCES.

Specification forming part of Letters Patent No. 165,282, dated July 6, 1875; application filed March 25, 1875.

*To all whom it may concern:*

Be it known that I, FRANCIS WELDON, of Mominabad, Deccan, India, have invented a new and Improved Apparatus for Measuring Distances; and I do hereby declare that the following is a full, clear, and exact description of the same, reference being had to the accompanying drawing, forming a part of this specification.

My invention proceeds on the principle of first dividing into equal parts a straight line, (which for convenience of reference I will call a range-line,) and then selecting a point at right angles to that line and at such a distance as to enable the observer to see distinctly each of the divisions on the range-line from beginning to end. All the divisions being thus distinctly visible, the next operation is to make a scale, the divisions of which shall correspond with the divisions of the range-line. This is done by setting up at the point of observation, and at right angles to the range-line, a bar having a pointer or limb hinged to it. This limb, when aligned on each of the divisions of the range-line in succession, will exhibit a distinct movement, but as the movements of the limb when brought to bear on the distant divisions must be very slight on account of perspective, it is necessary to have some means of registering this slight movement on an increased scale large enough for distinct subdivision. This is effected by the arrangement of indicator and guide-rod in my instrument, hereafter fully described.

The distance from the range-line to the point from whence the farthest division is clearly visible constitutes the base of my method, which base will vary in proportion to the length of range for which it is required. Thus, for a range of one thousand five hundred yards a base of fifty yards would be sufficient, while four thousand yards would require a base of one hundred yards. This length of base may seem very great as compared with that of other methods, but it is not more than under ordinary circumstances of field-service would be available. Even the longest that would be required (one hundred yards) is not more than the frontage of a field-battery in its normal formation, and, as the longer base is calculated to give more accurate results, advantage ought to be taken of the space available; and by the use of my invention the following are obtainable advantages: first, accuracy; second, speed in the determination of distances; third, simplicity and non-liability to derangement.

As regards the first—accuracy—the distances marked on the bar having been carefully ascertained by actual measurement the instrument has only to be placed under the same conditions with reference to the distant object as it was to the object from which the measurement was previously obtained, to give the same result, and those conditions are that the instrument be set up at right angles to a staff, and the distant object at a certain predetermined distance from that staff.

Secondly, the time required to find the distances is the time a man would take to run to the end of a line of from fifty to one hundred yards long, and with an optical square determine a right angle with the instrument and the distant object, marking the spot with a staff; and while doing so the sights of the bar can be brought to bear on the staff and the limb on the distant object, so that the determination of the right angle and the distance would be almost simultaneous.

Thirdly, the simplicity of the instrument—no part being liable to derangement, while it possesses delicate accuracy combined with strength. When closed it could be secured to the trail, or any other convenient part of a gun or limber, instead of occupying the space allotted to several rounds of ammunition, as the Nolan range-finder does.

For infantry a rifle might be fitted with a light limb indicator and guide-rod to close along the barrel without adding very much to its weight. In fact the optical square is the only part of the instrument which is expensive; and I would here remark that although I have in these presents only mentioned the bar as the place where the graduated scale should be engraved, yet it might be engraved on the indicator.

My range-finder is specially adapted for surveying, as the observer has only to take the bearings and distances of any object within range of his instrument to make a far more accurate plan than he could with the prismatic compass alone, and that, too, without having to move beyond the space required for his base.

It must also be borne in mind that my method is not restricted to the measurement of four thousand yards or so, but may, with the aid of telescopes and a prolongation of base, be extended to miles, according to the power of the telescopes.

My instrument above mentioned I will now more particularly describe. It consists of a bar, to which is hinged an arm or limb of such length that when closed on the bar their two ends will come together. To the end of the limb farthest from its joint is hinged an index-rod of suitable breadth and thickness, and of such a length as to reach from the end of the limb, when fully extended, to the end of the bar on which the limb closes. To that end of the bar is hinged one end of a guiding-rod, its other end being hinged to the index-rod, the guiding-rod itself being of such length, and hinged to the index-rod in such a place, as to allow the limb to be opened or extended to the full required distance, and also to be closed together with the index-rod along the length of the bar, thus forming them apparently into one. On extending the limb the index-rod travels along the bar forward or backward as the limb is extended or closed. The upper surface of the bar, over which the index-rod travels, is graduated as a scale, and has distances marked on it. The bar is furnished with a fore and back sight. The limb is also furnished with two sights, fore and back, or with a telescope.

The instrument is used as follows: Place the bar on a tripod and a support or other convenient rest, and from it measure the length of base for which the instrument may have been graduated. At that distance set up a staff to mark the exact spot at which an angle of ninety degrees is subtended by the instrument and the object whose distance is to be ascertained. This can be done with an optical square, reflecting telescope, or other suitable instrument. On this staff direct the fore and back sights of the bar. Then, without altering the direction of the bar, align the fore and back sights of the limb on the distant object, and the distance indicated by the index-rod on the graduated scale of the bar will be the distance of the object from the staff.

The instrument is graduated as follows: A level piece of ground having been selected, on it is marked a range-line of, say, three thousand yards. Along the whole length of this line, commencing from its base, intervals of, say, fifty yards, are accurately measured and marked. The length of base-line being now decided upon, the instrument is set up at that distance, say, fifty or sixty yards, exactly at right angles to the range-line, and the back and fore sights of the bar are carefully aligned on the staff which marks the base of the range-line, and the exact spot subtended at an angle of ninety degrees by the instrument, and all the intervals marked on the range-line; then without altering the direction of the bar, the back and fore sights of the limb are aligned accurately on each of the fifty-yard-interval marks in succession, and the spaces indicated by the index-rod are marked off and numbered on the upper surface of the bar. These spaces can be subdivided and numbered afterward. The instrument is now ready for use.

As there is room on the bar for more than one scale of distances it can be graduated in the manner described above for bases of different lengths.

Should extreme accuracy be required, the limb can be furnished with a telescope, thus reducing the inherent error of vision to a minimum.

Corresponding to the scale of distances, another scale can be marked on the bar, showing the elevation, length of fuse, and other usual points required for each distance.

Having thus far described my said invention, therein particularly describing and ascertaining the nature of the same, I will now further describe the same with reference to the accompanying drawings, so as to particularly describe and ascertain in what manner the same is to be performed or carried out in practice—that is to say—

Figure 2:
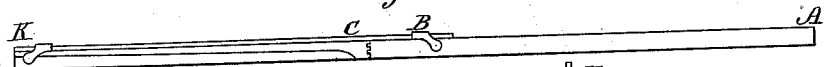
Figure 3:
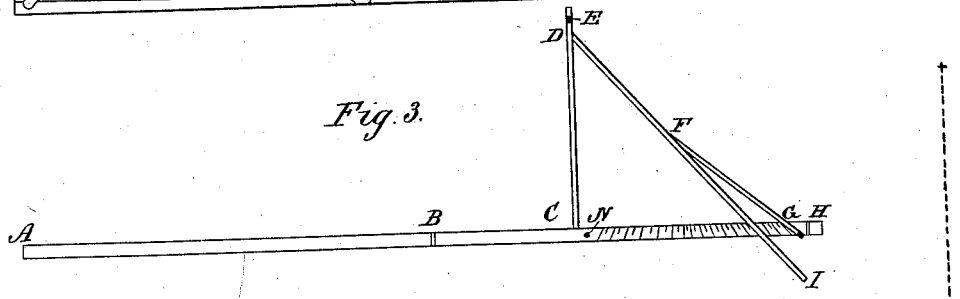
Figure 4:
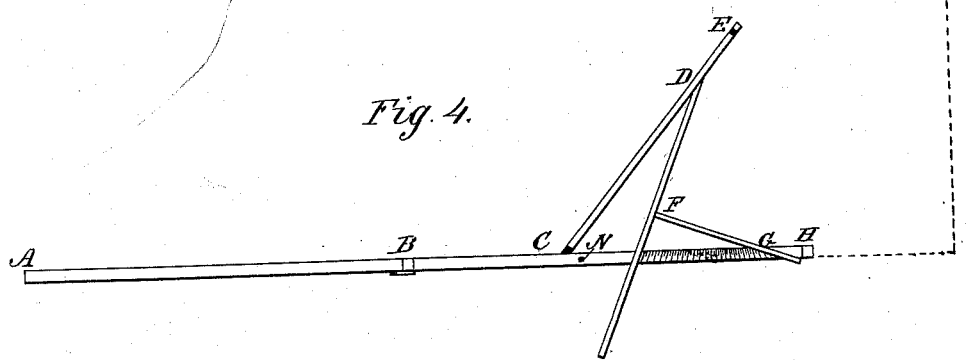
Figure 5:
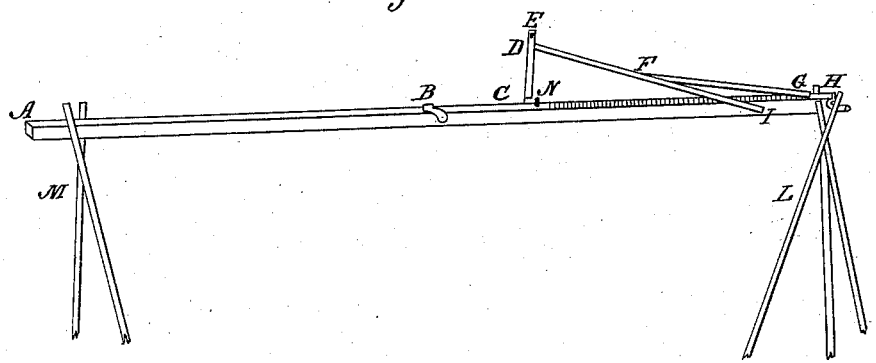

Figure 1 is a side elevation of the instrument, showing it closed up. Fig. 2 is an elevation of the other side of the instrument, showing the limb hinged onto and closed upon the instrument. Fig. 3 is a plan of the instrument, showing the limb extended and the positions occupied by the indicator and guide-rod when the limb is extended, and also the scale of distances on the upper surface of the bar. Fig. 4 is also a plan of the instrument, showing the positions occupied by the indicator and guide-rod when the limb is partially extended. Fig. 5 is a view, in perspective, of the instrument mounted on tripod and support.

The same letters of reference refer to the same parts in all the figures.

A B is an extension of the bar to place on the support M, Fig. 5, or to hold in the hand when the two sights B and H are aligned on the staff. B and K are clasps working on pivots passed through the bar, and used to confine the limb C D E, when closed along the bar, together with the indicator and guide-rod, as shown in Figs. 1 and 2. The clasp B, when raised, as in Fig. 5, forms the back sight of the bar. The fore sight of the bar H, Fig. 5, can, by a simple contrivance, be raised or depressed as the limb is extended or closed. The fore sight of the limb at E may consist of a very finely-pointed piece of wire pointing downward, which, when the limb is closed, can be passed into a niche cut in the bar to receive it, and so protect it from injury when not in use. The back sight of the limb is placed on the bar at N close to the joint of the limb at C, so that when the limb is closed the back sight also is protected from injury.

When the instrument is placed on the tripod and support, as shown in Fig. 5, and the fore and back sights of the bar aligned on the staff, as before explained, the observer looking through the back sight N, Fig. 5, and moving the indicator or index rod D F I, Fig. 5, backward or forward with his right hand, can align the fore sight E of the limb C D E, Fig. 5, with great accuracy on the distant object.

Having thus described my invention, what I claim as new is—

The bar A B H, having sights B and H, and a graduated scale thereon, the limb C D E, having also sights at its extremities, and the indicator D F I, all combined and arranged, as shown and described, to form an apparatus for measuring distances.

The above specification signed by me this 9th day of November, 1874.

F. WELDON, [L. S.]
    *Capt. 1st Cav. Hyd. Contgt.*

Witnesses:
 WM. WATSON,
  *Merchant, Bombay.*
 P. J. D. REMEDIOS,
  *Clerk to T. Lidbetter,*
   *Notary Public, Bombay.*